US007116685B2

(12) United States Patent
Brown et al.

(10) Patent No.: US 7,116,685 B2
(45) Date of Patent: Oct. 3, 2006

(54) COMMUNICATION PARAMETER ADJUSTMENT SYSTEM IN AN INTERNET COMPATIBLE BI-DIRECTIONAL COMMUNICATION SYSTEM

(75) Inventors: Larry Cecil Brown, Westfield, IN (US); John Alan Gervais, Carmel, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 1041 days.

(21) Appl. No.: 09/821,600

(22) Filed: Mar. 29, 2001

(65) Prior Publication Data

US 2002/0141544 A1 Oct. 3, 2002

Related U.S. Application Data

(60) Provisional application No. 60/227,140, filed on Aug. 22, 2000.

(51) Int. Cl.
*H04J 1/00* (2006.01)
(52) U.S. Cl. .................. 370/485; 370/252; 725/111; 725/107
(58) Field of Classification Search ........ 370/485–487; 725/105–153
See application file for complete search history.

(56) References Cited

U.S. PATENT DOCUMENTS

| 5,371,551 | A | 12/1994 | Logan et al. ............... 348/571 |
| 5,721,827 | A | 2/1998 | Logan et al. ........... 395/200.47 |
| 5,790,533 | A | 8/1998 | Burke et al. |
| 5,881,362 | A * | 3/1999 | Eldering et al. ............ 725/125 |
| 6,233,235 | B1 * | 5/2001 | Burke et al. ................ 370/356 |
| 6,400,863 | B1 * | 6/2002 | Weinstock et al. ............ 385/24 |
| 6,453,472 | B1 * | 9/2002 | Leano et al. ................ 725/111 |
| 6,588,016 | B1 * | 7/2003 | Chen et al. ................. 725/111 |
| 6,594,251 | B1 * | 7/2003 | Raissinia et al. ........... 370/347 |
| 6,772,437 | B1 * | 8/2004 | Cooper et al. .............. 725/111 |
| 6,785,292 | B1 * | 8/2004 | Vogel ......................... 370/433 |
| 6,877,166 | B1 * | 4/2005 | Roeck et al. ............... 725/111 |
| 2001/0036199 | A1 * | 11/2001 | Terry .......................... 370/487 |

FOREIGN PATENT DOCUMENTS

| CN | 1142296 A | 2/1997 |
| CN | 1162381 A | 10/1997 |
| JP | 4-268858 | 9/1992 |
| WO | WO 98/40972 | 9/1998 |

OTHER PUBLICATIONS

"Cisco uBR7200 Series MC16S Cable Modem", article found at: http://www.ieng.com/univercd/cc/td/doc/product/software/ios120/120newft/1201.../mc16s.ht, Sep. 8, 2000, pp. 1-2 of 33 and 23-30 of 33.

* cited by examiner

*Primary Examiner*—Seema S. Rao
*Assistant Examiner*—Michael J. Moore
(74) *Attorney, Agent, or Firm*—Joseph J. Laks; Ronald H. Kurdyla; Guy H. Eriksen

(57) ABSTRACT

A bi-directional communication system advantageously automatically senses and reports problems to a central operator network management station and operates with fewer subscriber service interruptions by detecting and correcting such conditions before they result in subscriber service interruption. Specifically, a system adaptively varies upstream transmission power level to prevent communication interruption in a cable modem network. A method for adaptively adjusting communication operation by varying a transmission parameter involves retrieving a communication parameter from memory and comparing the retrieved parameter with a predetermined threshold. A message is transmitted to a CATV head-end at a remote site representing that the parameter value indicates adjustment of the parameter is necessary.

30 Claims, 3 Drawing Sheets

COMMUNICATION PARAMETER ADJUSTMENT SYSTEM IN AN INTERNET COMPATIBLE BI-DIRECTIONAL COMMUNICATION SYSTEM

This is a non-provisional application of provisional application Ser. No. 60/227,140 by L. C. Brown et al., filed Aug. 22, 2000.

FIELD OF THE INVENTION

This invention concerns a system for use in interactive bi-directional communication in a device such as a cable modem, computer, TV, VCR, or an associated peripheral device.

BACKGROUND OF THE INVENTION

Home entertainment systems that combine Personal Computer and television functions (PC/TV functions) are increasingly becoming generic, User interactive, multiple source and multiple destination communication devices. Such systems are required to communicate in different data formats between multiple locations for a variety of applications in response to User requests. For example, a system may receive data from satellite or terrestrial sources comprising High Definition Television (HDTV) broadcasts, Multi-point Microwave Distribution System (MMDS) broadcasts and Digital Video Broadcasts (DVB). A system may also receive and transmit data via telephone (e.g. the Internet) and coaxial lines (e.g. cable TV lines via a cable modem) and from both remote and local sources such as Digital Video Disk (DVD), CDROM, VHS and Digital VHS (DVHS™) type players, PCs, and many other types of sources.

It is desirable for Internet compatible bi-directional communication systems that are used in conjunction with home entertainment systems to accommodate the network cable length and associated transmission power level variation occurring in a cable distribution network. This requirement and associated problems are addressed by a system according to the present invention.

SUMMARY OF THE INVENTION

A system adaptively varies upstream transmission power level to prevent communication interruption in a cable modem network. A method for adaptively adjusting communication operation by varying a transmission parameter involves retrieving a communication parameter from memory and comparing the retrieved parameter with a predetermined threshold. A message is transmitted to a CATV head-end at a remote site representing that the parameter value indicates adjustment of the parameter is necessary.

DETAILED DESCRIPTION OF THE DRAWINGS

Figure 1:
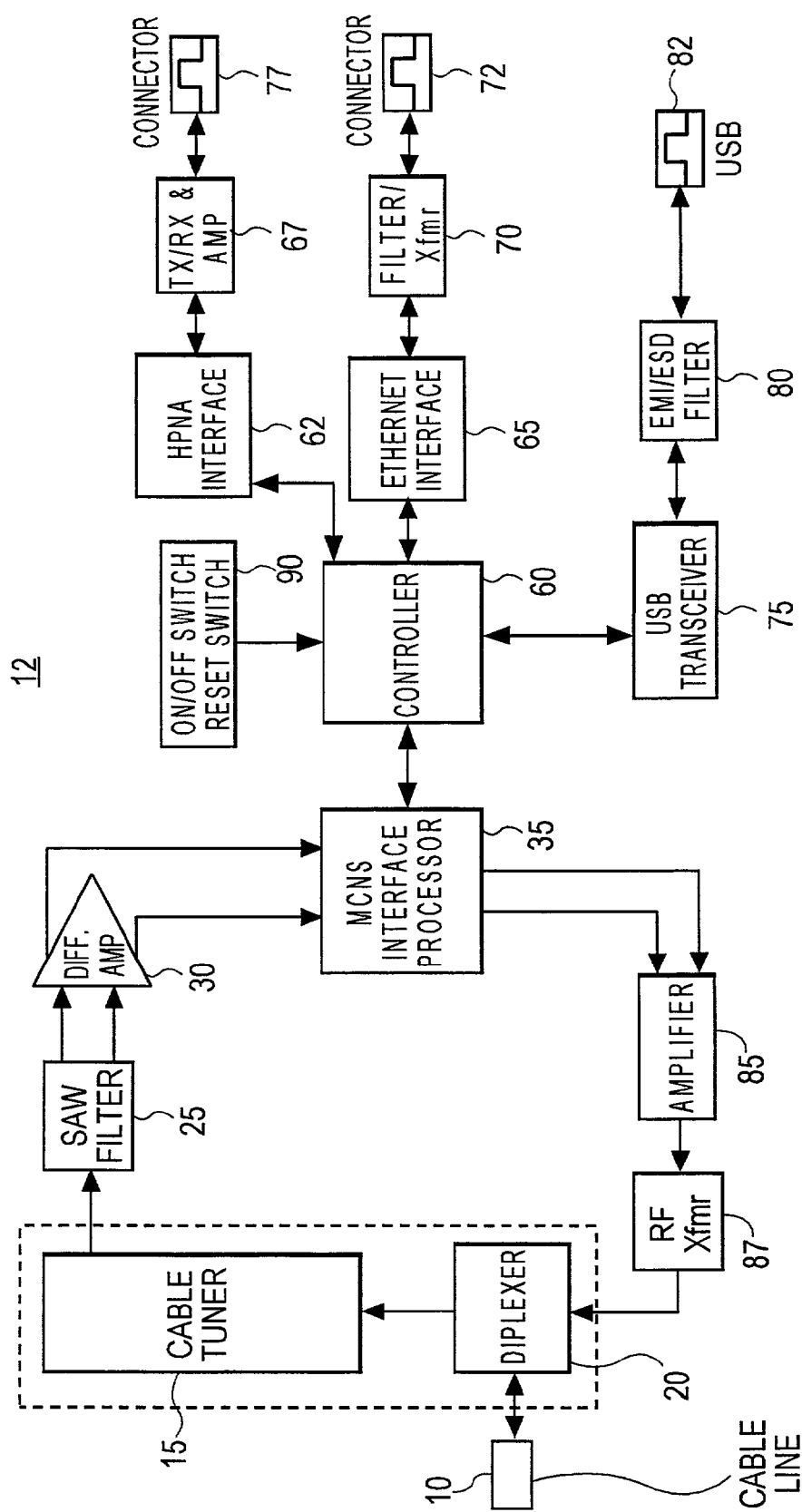
FIG. 1 shows a block diagram of a cable modem incorporating adaptive upstream transmission power level adjustment, according to the invention.

FIG. 1 shows a block diagram of a cable modem (e.g. DOCSIS standard compliant modem) capable of adaptively varying transmission power level of signals transmitted by the modem to the CATV head-end. The cable modem provides a communication bridge between a cable TV system and a PC (or another device such as a TV), for example. The modem communicates with the cable system head end via SNMP (Simple Network Management Protocol). The disclosed power level adjustment system reduces cable modem service interruption for subscribers. This is accomplished by providing the cable operator with an "early warning" that the transmission power level is operating too close to a performance threshold and that, as a result, a service interruption may occur soon.

The particular threshold concerned is a settled upstream transmit power level from the modem to the CATV head-end. Cable operator upstream path problems are a common cause of service interruption to subscribers due to improper upstream path gain or loss between particular cable modems in the cable network and the cable operator head-end. This problem may be caused, for example, by technician misadjustment of cable plant amplifiers and RF splitting or combining networks. The described cable modem system advantageously automatically senses and reports problems to a central cable operator network management station. Thereby the disclosed system operates with fewer subscriber service interruptions, improves system up-time, and forestalls out-of-service conditions by detecting and correcting such conditions before they result in subscriber service interruption.

The exemplary embodiment of FIG. 1 supports cable modem communication and decoding of data in hierarchically arranged protocols including TCP/IP (Transmission Control Protocol/Internet Protocol), Ethernet and MPEG (Motion Picture Experts Group) protocols (e.g. per MPEG2 ISO/IEC 13818-1 of Jun. 10, 1994, and ISO/IEC 13818-2, of Jan. 20, 1995). In addition, the system of FIG. 1 is compatible with the Multimedia Cable Networks Systems (MCNS) preliminary requirements and DOCSIS 1.0 (Data Over Cable Service Interface Specification 1.0) requirements ratified by the International Telecommunications Union (ITU) March 1998 and associated EuroDOCSIS requirements and other documents provided by the IETF (Internet Engineering Task Force) RFCs (Requests For Comment) such as RFC 2669. The RFC documents are available via the Internet and are prepared by Internet standards working groups.

The principles of the invention may be applied to any bi-directional communication system and are not restricted to cable, ADSL, ISDN, conventional type modems or DOCSIS compatible modems. Further, the disclosed system processes Internet Protocol (IP) data from a variety of Internet sources including streamed video or audio data, telephone messages, computer programs, Emails or other packetized data and communications, for example.

The cable modem (system 12) of FIG. 1 communicates with a CATV head-end over a bi-directional broadband high speed RF link on line 10 which typically consists of coaxial cable or hybrid fiber/coax (HFC). The modem system 12 bi-directionally communicates with devices located at a User site over local area networks (LANs). Typical User-side local area networks include Digital/Intel/Xerox Ethernet compatible networks attached via connector 72. Other User-side devices communicate via a Universal Serial Bus (USB) or HPNA (Home Phone Line Network Association) compatible networks attached via connectors 82 and 77 respectively. User devices attached on the Ethernet, HPNA and USB networks may include equipment such as personal computers (PCs), network printers, video receivers, audio receivers, VCRs, DVDs, scanners, copiers, telephones, fax machines and home appliances, for example.

In operation, diplexer 20 of cable modem system 12 of FIG. 1 separates upstream communications (sent from modem 12 to a CATV head-end) from downstream communications (sent from a CATV head-end to modem 12) conveyed via cable line 10. Diplexer 20 separates upstream data from downstream data based on the different frequency ranges that the upstream data (typically 5–42 MHz) and downstream data (typically 88–860 MHz) respectively employ. Controller 60 configures the elements of cable modem 12 of FIG. 1 to receive DOCSIS/MPEG2 transport data from the CATV head-end on cable line 10 and to convert the data to Ethernet, USB or HPNA compatible format for output via ports 72, 82 and 77 respectively. Similarly, controller 60 configures the elements of cable modem 12 of FIG. 1 to receive Ethernet, USB or HPNA compatible data from ports 72, 82 and 77 and to convert and transmit DOCSIS transport protocol data to the CATV head-end on cable line 10. Controller 60 configures the elements of system 12 through the setting of control register values within these elements using a bi-directional data and control signal bus. Specifically, controller 60 configures tuner 15, saw filter 25, differential amplifier 30 and MCNS (Multimedia Cable Networks Systems) interface device 35 to receive a DOCSIS formatted signal on a previously identified RF channel frequency. The DOCSIS formatted signal comprises an MPEG2 transport protocol format conveying Ethernet compatible data frames including IP data content.

Figure 2:
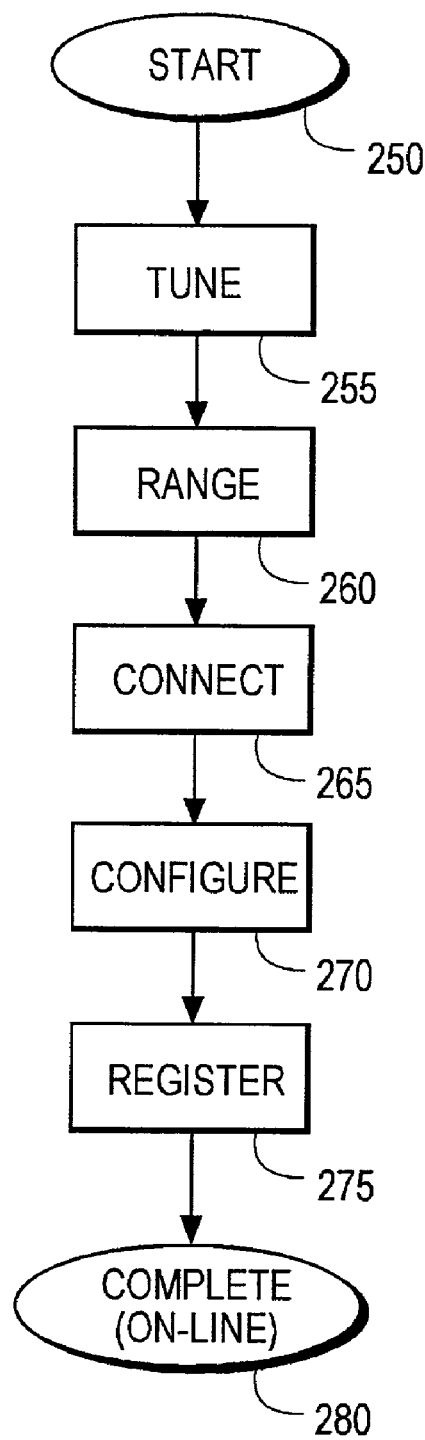
FIG. 2 shows a cable modem start up sequence, according to the invention.

Controller 60 employs the process shown in FIG. 2 for initializing system 12 of FIG. 1 and for selecting an initial power transmission level for transmitting of signals from system 12 to the CATV head end. Specifically, FIG. 2 shows a series of operational states through which the FIG. 1 DOCSIS compliant cable modem system 12 progresses during startup to become fully operational. Upon application of power to modem system 12 in step 250 of FIG. 2, controller 60 executes bootloader software uploaded from flash memory within unit 60 to set all modem components to their initial power on condition. In step 255 of FIG. 2, controller 60 (FIG. 1) directs system 12 in determining the RF channel frequency that tuner 15 is to be configured to receive by iteratively tuning to successive candidate RF channel frequencies until a DOCSIS compliant signal is obtained. Controller 60 recognizes a DOCSIS compliant signal on a candidate channel through the successful decode by MCNS interface processor 35 of the received data and through a correspondingly acceptable error rate for the decoded data.

In step 260 of FIG. 2, controller 60 initiates Ranging by directing system 12 in transmitting data upstream to the CATV head-end using MCNS interface 35, amplifier 85 and RF transformer 87. The Ranging function involves adaptively and iteratively adjusting upstream and downstream communication parameters including cable modem transmission power level and timing offset. Specifically, system 12 incrementally increases the power level of signals conveying status messages periodically transmitted to the CATV head end. This is done until system 12 receives an acknowledgement from the CATV head end indicating that the messages are successfully received. The CATV head-end determines when Ranging is completed and communicates that Ranging is terminated to system 12. At completion of Ranging, communication between system 12 and the CATV head-end involving Media Access Control (MAC) layer protocol is established.

In step 265 of FIG. 2, controller 60 initiates Connecting by directing system 12 in establishing bi-directional communication between modem system 12 and the CATV head-end involving DHCP (Dynamic Host Configuration Protocol) communication with a remote DHCP server. Specifically, the system 12 IP (Internet Protocol) address and other configuration parameters are acquired from the DHCP server and stored in memory within unit 60. Upon successful completion of the Connecting process, the cable modem is operable as an Internet host, and has an assigned IP address.

In step 270 of FIG. 2, controller 60 initiates Configuring by acquiring the date and time from a remote internet TIME server using internet TIME protocol and by downloading a Configuration File for modem system 12 from a remote TFTP (Trivial File Transfer Protocol) server using TFTP. The configuration file includes SNMP compatible data conveying threshold values defining warning zones near the minimum and/or maximum operational limits for the power level to be used in transmitting signals from system 12 to the CATV head end. System 12 sends alert messages to the CATV head end if the transmission power level used by system 12 exceeds these threshold values and the power level lies within a warning zone. SNMP messages may also be used to activate and deactivate the alert messages and threshold comparison mechanism and to adjust thresholds and message repetition rate after initialization or at other times of modem operation. The configuration file SNMP data may also determine the repetition frequency at which alert messages (including the actual power level value employed by system 12) are transmitted to the CATV head end. The DOCSIS standard allows parameters such as the transmission power level threshold values and alert message repetition frequency to be incorporated into the mandatory configuration file that a cable modem downloads during its startup. Thereby the threshold and repetition frequency values may be advantageously set automatically each time a cable modem is installed and performs its DOCSIS initialization routine. If no threshold values or alert message repetition data is provided in the configuration file then predetermined default settings contained in system 12 memory are used. Upon completion of the Configuring operation, modem system 12 has received and stored sufficient information to become operational and is in condition to receive a signal from the CATV head-end to initiate becoming fully online and operational.

In step 275 of FIG. 2, controller 60 initiates Registering by directing system 12 in communicating key configuration parameters applied by the modem system 12 to the CATV head-end for final acceptance. The CATV head-end compares the configuration parameters employed by system 12 with the configuration parameters previously supplied from the CATV head-end to system 12. Upon determining that they match, the CATV head-end notifies system 12 that registration is completed and that system 12 is on-line and operational. The process of FIG. 2 is complete at step 280.

Figure 3:
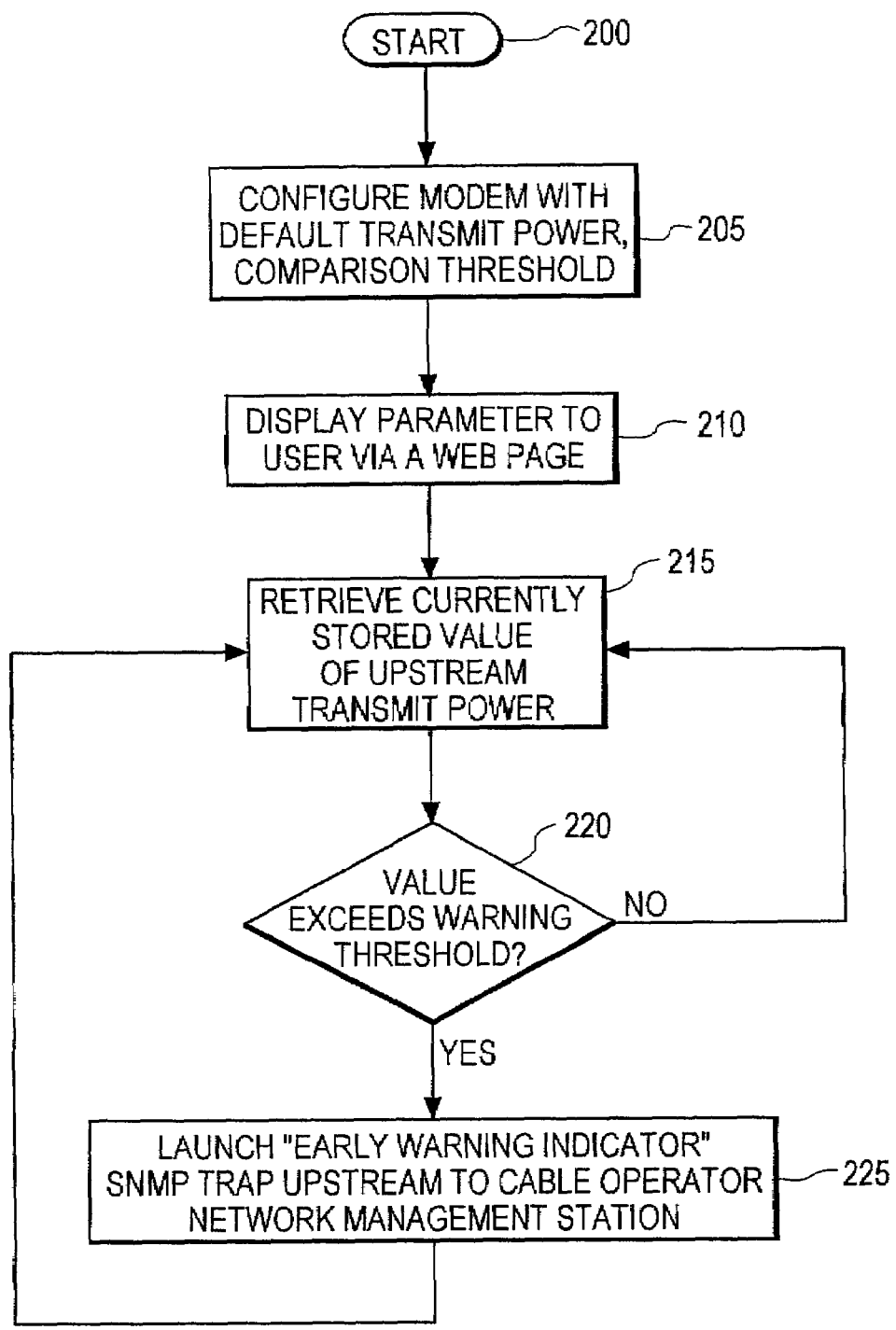
FIG. 3 presents a flowchart of a method for adaptively adjusting upstream transmission power level, according to the invention.

FIG. 3 shows a flowchart of a method for use by system 12 (FIG. 1) for monitoring the upstream transmitter power level of a DOCSIS-compliant cable modem and for automatically sending a warning at predetermined intervals to a CATV listening network management station if a settled power level falls outside a range of acceptable values. The DOCSIS standard requires that a compliant cable modem supports Simple Network Management Protocol (SNMP) as well as related software procedures and virtual data stores of cable modem operating information termed Management Information Bases (MIBs). The MIBs allow remote management of cable modem operations by a management station, operated from the cable head-end, or by a network operations center controlled by an Internet service provider, for example. Further, some MIBs may be defined by a modem provider. The method of FIG. 3 is implemented in the form of a collection of settable MIB objects executed by controller 60 (FIG. 1).

In step 205 of FIG. 3, following the start at step 200, if no power threshold values or alert message repetition data is provided in the configuration file received during initialization, controller 60 configures system 12 with default values. The power threshold values determine alert thresholds for the power level used in communicating signals from system 12 to the CATV head end. Also the repetition data determines the frequency at which alert messages (including the actual power level value employed by system 12) are transmitted to the CATV head end. The default values may be predetermined by a modem provider and may be viewed (or may be set in non-DOCSIS compatible applications) by User operation of an attached PC (e.g. attached to port 72—FIG. 1) through a private MIB. In step 210, the power threshold values or alert message repetition data, in use by system 12, may be accessed and viewed on a web page generated by system 12 for display on an attached PC in response to a User command via the PC. The displayed web page may be employed as the User interface supporting User viewing of these values and also, in non-DOCSIS compatible applications, the selection and update of these values.

In step 215, controller 60 periodically reads the current upstream transmit power level and in step 220, compares this power level with the thresholds previously obtained in step 205. In another embodiment, the period at which this comparison is made may also be defined by a User via a configuration file or default setting or by User data entry via an attached PC. If the comparison indicates that the power level is in a warning zone, i.e. is at or above a maximum threshold, or is at or below a minimum threshold, controller 60 initiates sending of an alert message to the CATV head end in step 225. The thresholds may be selected, for example, so that an alert message is generated if the settled operating cable modem upstream transmit power is 10 dBmV or below (compared to a DOCSIS specified minimum of 8 dBmV) or 54 dBmV or above (compared to a DOCSIS specified maximum of 58 dBmV). The alert message is automatically sent to the CATV head end as a SNMP compatible message (termed a Trap) at a repetition frequency (e.g. every 3 minutes) defined by the configuration repetition data obtained in step 205. The message is repeated until cable system adjustments are made that result in clearance of the condition causing the alert message. Once this occurs controller 60 periodically executes steps 215 and 220 and the alert message transmissions generated in step 225 cease. The frequency at which the power level is checked in steps 215 and 220 is determined by a configuration file parameter, or by a default value. Note, a Trap is an SNMP message type defined in the SNMP protocol that can be launched by a networking device (e.g. a cable modem) to a CATV head-end (e.g. a cable operator's central monitoring station) at any time the network device deems necessary.

In normal operation, the upstream transmission power level of system 12 of FIG. 1 is within defined thresholds and no alert message is generated. In normal operation, an RF carrier is modulated with MPEG2 transport protocol data using 64 or 256 QAM (Quadrature Amplitude Modulation).

The MPEG2 transport data includes Ethernet formatted data which in turn includes IP data representing a User requested HTML (HyperText Mark-Up Language) web page, for example. The MPEG transport data is provided by diplexer 20 to tuner 15. Tuner 15 down-converts the input signal from diplexer 20 to a lower frequency band which is filtered by saw filter 25 to enhance signal isolation from neighboring RF channels. The filtered signal from unit 25 is level shifted and buffered by differential amplifier 30 to provide a signal compatible with MCNS interface processor 35. The resultant down converted, level-shifted signal from amplifier 30 is demodulated by MCNS processor 35. This demodulated data is further trellis decoded, mapped into byte aligned data segments, deinterleaved and Reed-Solomon error corrected within processor 35. Trellis decoding, deinterleaving and Reed-Solomon error correction are known functions described, for example, in the reference text *Digital Communication*, Lee and Messerschmidt (Kluwer Academic Press, Boston, Mass., USA, 1988). Processor 35 further converts the MPEG2 format data to Ethernet data frames that are provided to controller 60.

Controller 60 parses and filters the Ethernet compatible data from unit 35 using filters configured from the CATV head-end. The filters implemented by controller 60 match data identifiers in incoming Ethernet frame packets provided by unit 35 with identifier values pre-loaded from the CATV head-end. The identifier values are pre-loaded during the previously performed initialization operation. By this means controller 60 implements a data admission control function forwarding selected data to local LAN devices and discarding other selected data content. This configurable filter system may be advantageously used to filter data based on metadata items in the incoming data for a variety of purposes including based on, (a) content rating for parental or other blocking control, (b) predetermined User preferences for targeting advertisements and "push-content", (c) firewall filtering, (d) identity of source, and (e) a data search function. The filtered Ethernet compatible serial data is communicated to a PC via Ethernet interface 65, filter and isolation transformer 70 and port 72. Interface 65 buffers and conditions the data from controller 60 for filtering and transforming by unit 70 for output to a PC via port 72.

In similar fashion, controller 60 converts and filters data (conveyed in Ethernet MAC frames) from processor 35 for output in USB format via port 82 or in HPNA format via port 77. The USB data is buffered by transceiver 75 and filtered by noise and interference suppression (EMIESD) filter 80 prior to output to USB compatible LAN devices connected to port 82. Similarly, the HPNA data is conditioned by interface 62 and buffered by transceiver amplifier 67 prior to output to HPNA compatible LAN devices connected to port 77.

Modem system 12 communicates data upstream from an attached PC, for example, to a CATV head-end using a transmission power level selected during the initialization routine. For this purpose, controller 60 of system 12 receives Ethernet compatible data from the attached PC via port 72, interface 65 and filter/isolation transformer 70 and provides it to processor 35. Processor 35 modulates an RF carrier with the received Ethernet format data using 16 QAM or QPSK (Quadrature Phase Shift Keying Modulation). The resultant modulated data is time division multiplexed onto cable line 10 for upstream communication via amplifier 85, transformer 87 and diplexer 20. Amplifier 85 outputs the data to the CATV head-end with an appropriate power level selected in the previously described initialization process. Transformer 87 provides a degree of fault and noise isolation in the event of a failure in the modem 12 or upon the occurrence of locally generated noise in the modem or in attached devices.

In similar fashion, modem system 12 also communicates data upstream from devices attached via USB port 82 or via HPNA port 77. In an exemplary implementation, controller 60 of system 12 receives Ethernet compatible data from transceiver 75 and provides it to processor 35 for upstream communication in the manner previously described. For this purpose, transceiver 75 receives Ethernet data encapsulated within USB frames from port 82 via filter 80 and removes the USB frame data to provide Ethernet format data to controller 60. Similarly, interface 62 receives data encapsulated in HPNA format from port 77 via transceiver 67 and provides Ethernet format data to controller 60.

Controller 60 is also responsive to on/off and reset switch 90 and performs a variety of functions in addition to those already described. Controller 60 configures modem 12 parameters using configuration information provided from a CATV head-end. Controller 60 also directs system 12 in synchronizing and multiplexing upstream communication onto cable line 10 and implements a rate limit in controlling upstream data traffic. Further, controller 60 bi-directionally filters received data and provides selected data to either the CATV head-end or LAN devices attached to ports 72, 77 and 82. Controller 60 also supports data ranging communication with the CATV head-end. The ranging communication is initiated by the CATV head-end and comprises the continuous but intermittent polling of individual modems to determine status and to identify modem or line failures.

The architecture of the system of FIG. 1 is not exclusive. Other architectures may be derived in accordance with the principles of the invention to accomplish the same objectives. Further, the functions of the elements of the cable modem system 12 and the process steps of FIG. 3 may be implemented in whole or in part within the programmed instructions of controller 60. In addition, the principles of the invention may be applied in monitoring and threshold comparison of any communication parameters subject to iterative adjustment in an Internet compatible bi-directional communication system not just upstream transmission power level. The principles also apply in launching warning messages related to such parameters.

What is claimed is:

1. In a modem device for bi-directionally communicating with a remote head-end disposed in a location remote from the modem device, a method for providing warning of impaired communication, comprising the steps of:
   retrieving a communication parameter value from memory;
   comparing said retrieved communication parameter value with a predetermined threshold to identify an excessive communication parameter value indicative of a potential communication link impairment; and
   initiating substantially periodic transmission of a message from said modem device to said remote head-end indicating a non-modem-device-based system adjustment is necessary, in response to said comparison.

2. A method according to claim 1, wherein said message includes said retrieved communication parameter value.

3. A method according to claim 1, wherein said retrieved communication parameter value represents an actual transmission upstream power level for communicating from said modem device to said remote head-end.

4. A method according to claim 1, wherein said modem device is a cable modem and said transmission uses simple network management protocol (SNMP), and including the step of comparing said retrieved communication parameter value with minimum and maximum predetermined threshold values.

5. A method according to claim 1, including the step of receiving said predetermined threshold value from said remote head-end.

6. A method according to claim 5, including the step of using a default predetermined threshold value prior to said receiving of said predetermined threshold value from said remote head-end.

7. A method according to claim 5, including the step of configuring said modem device with said received predetermined threshold during an initialization operation.

8. A method according to claim 1, wherein said step of initiating substantially periodic transmission of said message comprises initiating transmission on one of, (a) a schedule, and (b) a repetition frequency, received from said remote head-end.

9. A method according to claim 1, including the step of using default schedule or repetition frequency values prior to receiving said schedule or repetition frequency values from said remote head-end.

10. A method according to claim 1, including the step of terminating transmission of said message upon said comparison step indicating said retrieved communication parameter value no longer exceeds said predetermined threshold.

11. A method according to claim 1, including the step of displaying at least one of, (a) said retrieved communication parameter value, (b) said predetermined threshold and (c) repetition frequency of said periodic transmission, in response to a user command.

12. A method according to claim 11, including the step of generating a web page for said displaying of said at least one of, (a) said retrieved communication parameter value, (b) said predetermined threshold and (c) repetition frequency of said periodic transmission.

13. In a modem device for bi-directionally communicating with a remote head-end disposed in a location remote from the modem device, a method for providing warning of impaired communication, comprising the steps of:
   retrieving a communication parameter value from memory;
   comparing said retrieved communication parameter value with a predetermined threshold to identify an excessive communication parameter value indicative of a potential communication link impairment; and
   initiating substantially periodic transmission of a message including said retrieved communication parameter value from said modem device to said remote head-end indicating a non-modem-device-based system adjustment is necessary, in response to said comparison.

14. A method according to claim 13, including the step of receiving said predetermined threshold value from said remote head-end.

15. A method according to claim 13, wherein said retrieved communication parameter value represents an actual transmission upstream power level for communicating from said modem device to said remote head-end.

16. In a modem device for bi-directionally communicating with a remote head-end disposed in a location remote from the modem device, a method for providing warning of impaired communication, comprising the steps of:
  retrieving a transmission power level value from memory;
  comparing said retrieved transmission power level value with a predetermined threshold to identify an excessive transmission power level value indicative of a potential communication link impairment; and
  initiating substantially periodic transmission of a message including said retrieved transmission power level value from said modem device to said remote head-end indicating a non-modem-device-based system adjustment is necessary, in response to said comparison.

17. A method according to claim 16, including the step of terminating transmission of said message upon said comparison step indicating said retrieved transmission power level value no longer exceeds said predetermined threshold.

18. A modem device for providing warning of impaired communication in a system in which said modem device is bi-directionally communicating with a remote head-end disposed in a location remote from the modem device, said modem device comprising:
  means for retrieving a communication parameter value from memory;
  means for comparing said retrieved communication parameter value with a predetermined threshold to identify an excessive communication parameter value indicative of a potential communication link impairment; and
  means for initiating substantially periodic transmission of a message from the modem device to said remote site head-end indicating a non-modem-device-based system adjustment is necessary, in response to said comparison.

19. The device of claim 18, wherein said message includes said retrieved communication parameter value.

20. The device of claim 18, wherein said retrieved communication parameter value represents an actual transmission upstream power level for communicating from said modem device to said remote head-end.

21. The device of claim 18 in which said modem device is a cable modem and said transmission uses simple network management protocol (SNMP), said modem device further comprising:
  means for comparing said retrieved communication parameter value with minimum and maximum predetermined threshold values.

22. The device of claim 18, further comprising:
  means for receiving said predetermined threshold value from said remote head-end.

23. The device of claim 22 further comprising:
  means for using a default predetermined threshold value prior to said receiving of said predetermined threshold value from said remote site head-end.

24. The device of claim 22, further comprising:
  means for configuring said modem device with said received predetermined threshold during an initialization operation.

25. The device of claim 18, wherein said means for inititiating substantially periodic transmission of said message further comprises:
  means for initiating transmission on one of, (a) a schedule, and (b) a repetition frequency, received from said remote head-end.

26. The device of claim 18 further comprising:
  means for utilizing default schedule or repetition frequency values prior to receiving said schedule or repetition frequency values from said remote head-end.

27. The device of claim 18, further comprising:
  means for terminating transmission of said message if said means for comparison indicates that said retrieved communication parameter value no longer exceeds said predetermined threshold.

28. The device of claim 18, further comprising:
  means for displaying at least one of, (a) said retrieved communication parameter value, (b) said predetermined threshold and (c) repetition frequency of said periodic transmission, in response to a user command.

29. The device of claim 28, further comprising:
  means for generating a web page for said displaying of said at least one of, (a) said retrieved communication parameter value, (b) said predetermined threshold and (c) repetition frequency of said periodic transmission.

30. A modem comprising:
  means for retrieving a transmission power level value from memory;
  means for comparing said retrieved transmission power level value with a predetermined threshold to identify a transmission power level value indicative of a potential communication link impairment; and means for launching a message, said message indicating that a non-modem-based system adjustment is necessary, from the modem to a remote head-end disposed in a location remote from the modem should said retrieved transmission power level value be at a value indicative of a potential communication link impairment.

* * * * *